United States Patent [19]

Hanafusa et al.

[11] Patent Number: 4,951,986
[45] Date of Patent: Aug. 28, 1990

[54] PLASTIC BUMPER

[75] Inventors: Kunio Hanafusa; Naoshige Fukuhara; Takaaki Tachibana, all of Okayama, Japan

[73] Assignee: Minoru Industrial Co., Ltd., Okayama, Japan

[21] Appl. No.: 453,942

[22] Filed: Dec. 20, 1989

[30] Foreign Application Priority Data

Dec. 24, 1988 [JP] Japan .................................. 63-327488
Dec. 24, 1988 [JP] Japan .................................. 63-327489
May 15, 1989 [JP] Japan .................................. 64-122290

[51] Int. Cl.⁵ .............................................. B60R 19/00
[52] U.S. Cl. .................................... 293/120; 293/122; 293/133; 264/523
[58] Field of Search ............... 293/120, 122, 132, 133, 293/102

[56] References Cited

U.S. PATENT DOCUMENTS 3,938,841  2/1976  Glance et al. .................... 293/120
4,076,296  2/1978  Ditto et al. ...................... 293/122
4,652,032  3/1987  Smith .............................. 293/120
4,904,008  2/1990  Glance ............................. 293/120

FOREIGN PATENT DOCUMENTS 173253  11/1987  Japan .
037367   3/1988  Japan .
112951   7/1988  Japan .
053052  10/1988  Japan .

OTHER PUBLICATIONS

Brandes, R., "Now Blow Molding is a Real Alternative for Critical Parts" the 1988 Structural Plastics Conference, Philadelphia, Pa.

Primary Examiner—Robert R. Song
Attorney, Agent, or Firm—Kanesaka & Takeuchi

[57] ABSTRACT

A plastic bumper for use in an automobile includes a front wall member generally having a U-shape cross-section, and a rear wall member having a mid portion intermittently indented to form a plurality of pyramid frustum shaped recesses. An outer end face of each pyramid frustum recess is adhered to an inside face of said front wall member. Thus, the bumper is reinforced with respect to vertical and horizontal impacts.

8 Claims, 10 Drawing Sheets

PLASTIC BUMPER

BACKGROUND OF THE INVENTION

1. Field of the Invention

The present invention relates to a plastic bumper for use in automobiles and, more particularly, to the structure of such plastic bumpers with rigid construction and capable of being formed by blow-molding.

2. Description of the Prior Art

Instead of metallic bumpers, plastic bumpers have been proposed However, the conventional plastic bumpers have thick wall structure to prevent easy deformation or destruction by external forces o impacts. Such structure results in heavyweight and high cost. Furthermore, such heavy bumpers are not easy to assemble to the automobile body, and are not contributing to produce a light weight automobile. If such plastic bumpers are made with thin plastic walls, there have been problems in the durability with respect to various external impacts.

For example, in FIG. 1, a cross-sectional view of a prior art plastic bumper formed by blow molding is shown, which is formed by a rear wall member 23 having a mid portion indented continuously along the lengthwise direction of the bumper to form a groove with a V-shape cross-section and a front wall member 22 having a U-shape cross-section. The outer bottom end face of the indented portion of the rear wall member 23 is adhered to the inside face of front wall member 22, by press welding.

Although the bumper structure shown in FIG. 1 is strong with respect to horizontal direction impacts, it is weak with respect to vertical direction impacts.

SUMMARY OF THE INVENTION

The present invention has been developed with a view to substantially solving the above described disadvantages and has for its essential object to provide an improved plastic bumper which has a thin wall structure but is strong with respect to external impacts in various directions.

It is also an important object of the present invention to provide an improved plastic bumper of the above described type which can be produced by blow-molding.

In accomplishing these and other objects, a plastic bumper arrangement according to a first embodiment of the present invention comprises a front wall member generally having a U-shape cross-section, and a rear wall member having a mid portion intermittently indented to form a plurality of recesses each having a shape of pyramid frustum. An outer end face of each pyramid frustum recess is adhered to an inside face of the front wall member.

A plastic bumper according to the first embodiment further comprises a plate rib extending between outer side faces of the neighboring pyramid frustum recesses.

According to a second embodiment of the present invention, the plastic bumper comprises a front wall member generally having a U-shape cross-section, and a rear wall member having a plurality of supporting tubes extending from a surface of the rear wall member and plate ribs extending between neighboring supporting tubes.

According to the preferred embodiment, the first and second wall members are formed by blow molding.

BRIEF DESCRIPTION OF THE DRAWINGS

These and other objects and features of the present invention will become apparent from the following description taken in conjunction with preferred embodiments thereof with reference to the accompanying drawings, throughout which like parts are designated by like reference numerals, and in which:

FIG. 8b is a cross-sectional view of a "heart" shaped tubular parison used in the molding of FIG. 8a;

FIGS. 21, 22 and 23, are views similar to FIGS. 15, 16 and 17, but particularly showing a plastic bumper according to a fourth embodiment of the present invention.

DETAILED DESCRIPTION OF THE PREFERRED EMBODIMENTS

Figure 5:
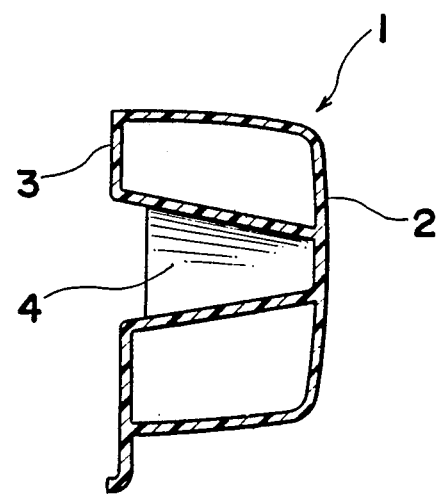
FIG. 5 is a cross-sectional view taken along a line V—V shown in FIG. 3.
Figure 6:
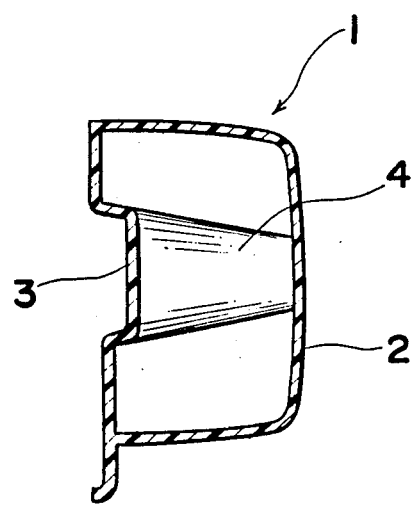
FIG. 6 is a cross-sectional view taken along a line VI—VI shown in FIG. 3.
Figure 7A:
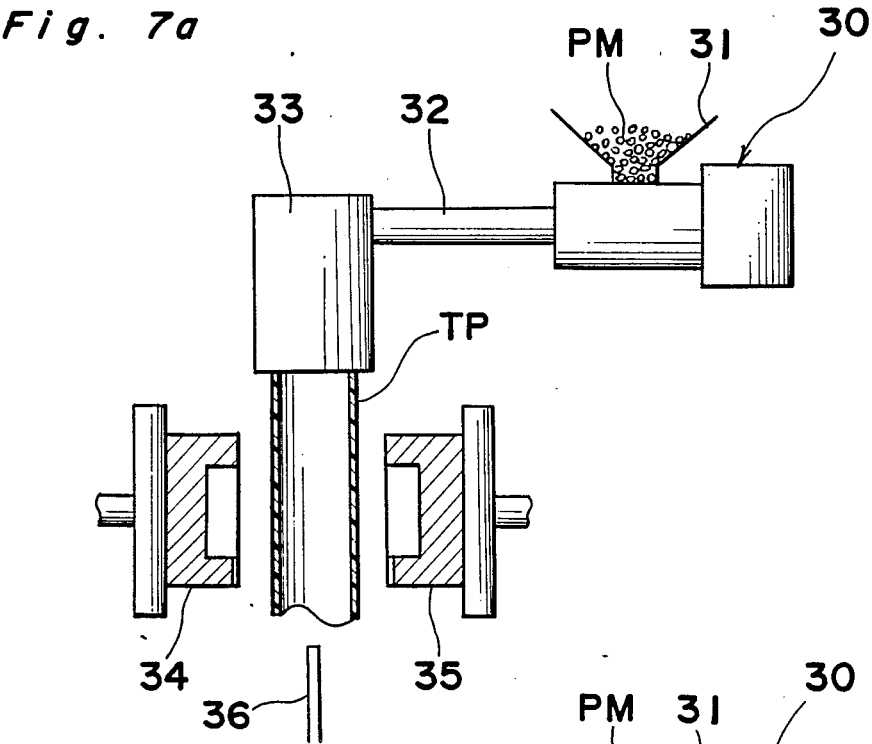
FIGS. 7a and 7b are diagrams showing molding process of the plastic bumper.
Figure 7B:
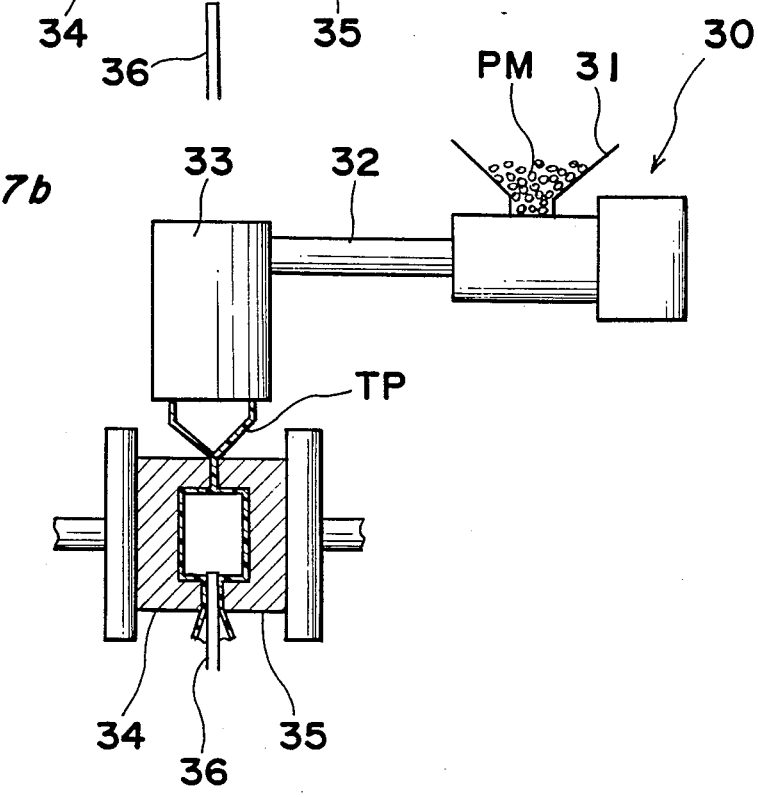

Referring to FIGS. 2 to 6, a plastic bumper 1 according to a first embodiment of the present invention is shown which comprises a front wall member 2 generally having a U-shape cross-section, as clearly shown in FIGS. 5 and 6, and a rear wall member 3 having a mid portion intermittently indented to form a plurality of recesses 4 each having a shape of pyramid frustum. The outer end face of each pyramid frustum 4 is adhered to the inside face of front wall member 2 by press welding during the blow molding process, as will be explained below.

Figure 1:
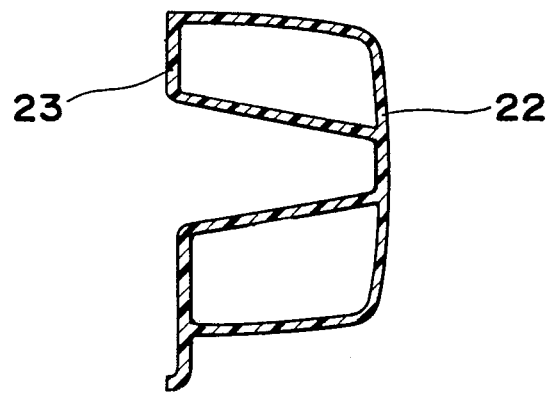
FIG. 1 is a cross-sectional view of a plastic bumper according to a prior art.
Figure 2:
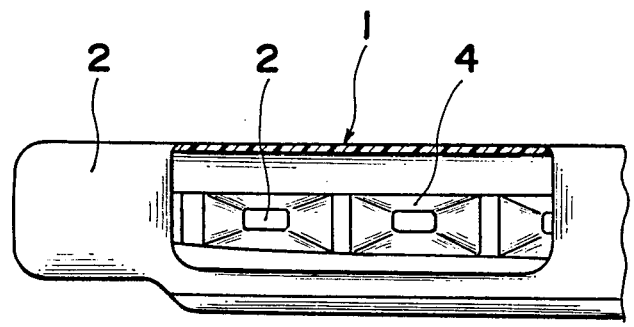
FIG. 2 is a front view partly cut off of a plastic bumper according to a first embodiment of the present invention.
Figure 3:
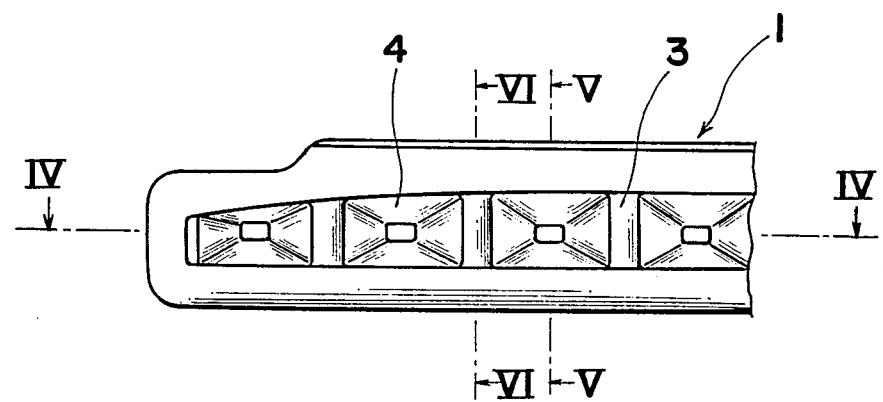
FIG. 3 is a rear view of the plastic bumper of FIG. 2.
Figure 4:
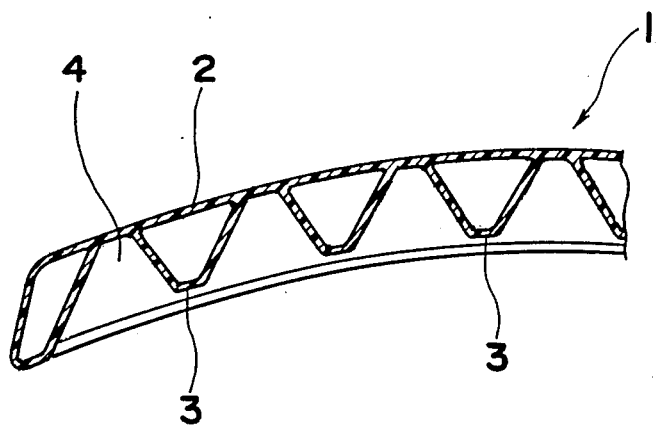
FIG. 4 is a cross-sectional view taken along a line IV—IV shown in FIG. 3.

Referring to FIGS. 7a to 8b, the blow molding apparatus for producing the plastic bumper 1 of FIG. 2 is shown. The blow molding apparatus has material receiving section 30 having a hopper 31 into which the plastic material PM is supplied and melted. The molten plastic is transferred through a suitable duct 32 to a head section 33 in which the molten plastic is formed into a tubular parison TP which droops down by the gravity force. Below the head 33, a pair of molds 34 and 35 are arranged, which move towards and away from each other, and an air blowing nozzle 36 is also provided. As the molds 34 and 35 move towards each other, blowing nozzle 36 is inserted into the tubular parison TP from the lower open end. When molds 34 and 35 are closed to hold the parison therein, high pressure air is blown inside the parison to complete the shaping of the molding piece. Thereafter, the molded piece is cooled, and then ejected from the mold.

Figure 8A:
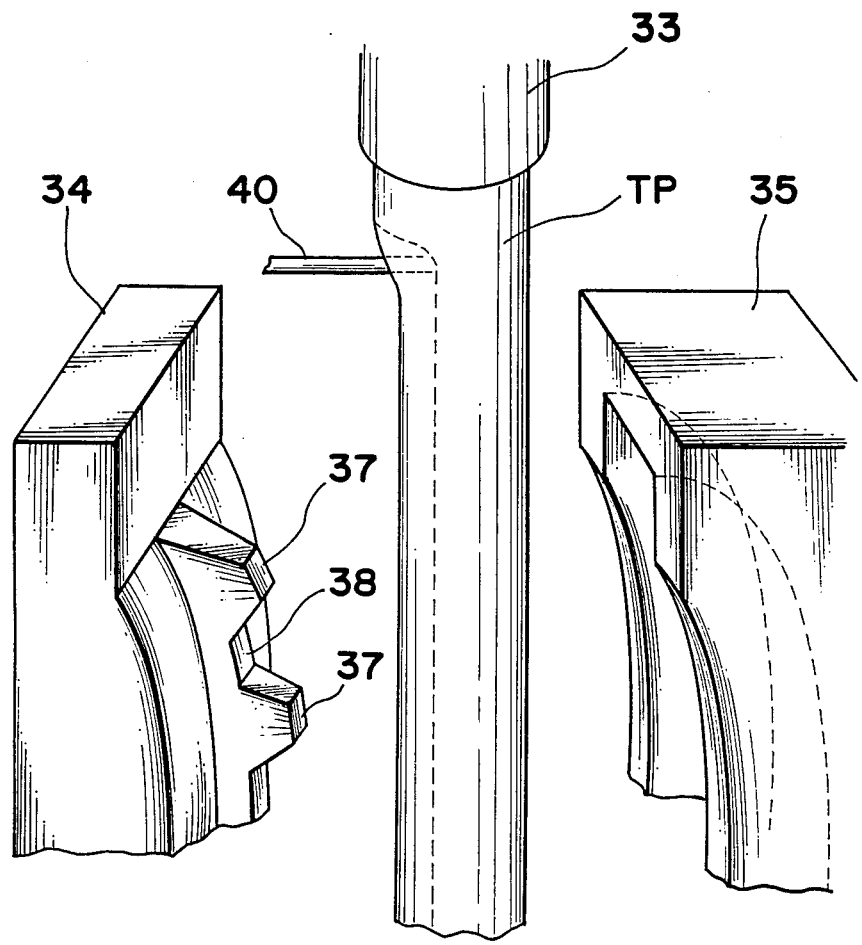
FIG. 8a is a perspective view of molds for molding the plastic bumper of FIG. 2.
Figure 8B:
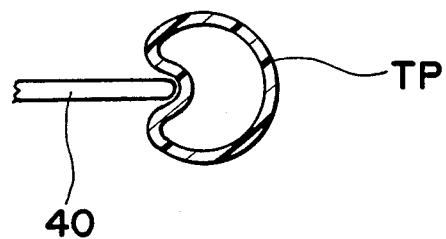
Figure 9:
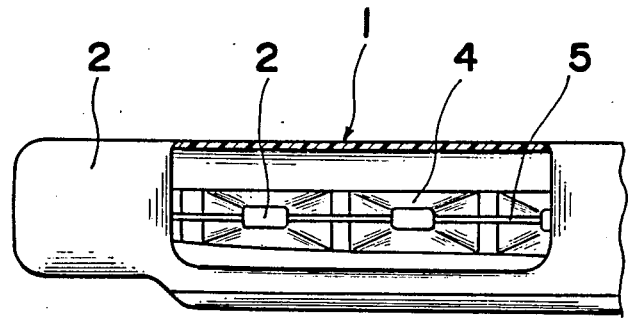
FIG. 9 is a partly cut off top plan view of a plastic bumper according to a second embodiment of the present invention.
Figure 10:
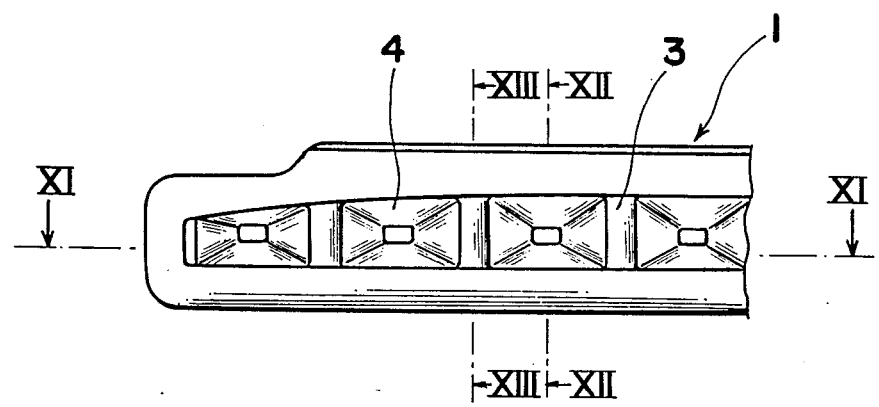
FIG. 10 is a rear view of the plastic bumper of FIG. 9.
Figure 11:
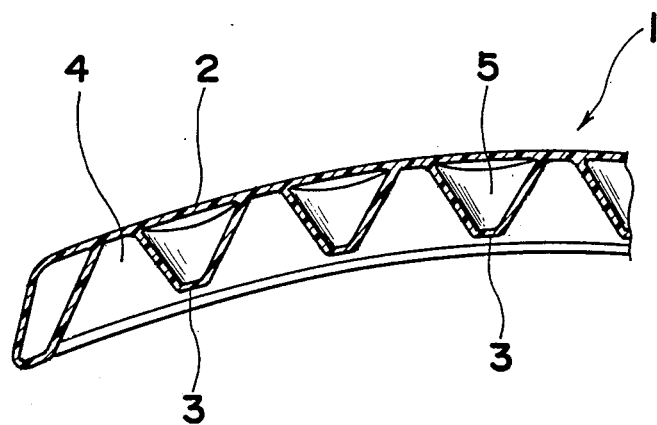
FIG. 11 is a cross-sectional view taken along a line XI—XI shown in FIG. 10.

Referring to FIG. 8a, the detail of the molds 34 and 35 used for molding the plastic bumper of FIG. 2 is shown. The mold 34 has a plurality of pyramid frustums 37 and bottom walls 38 extending between the frustums 37. Also, the tubular parison TP is shaped into a "heart" cross-section, as clearly shown in FIG. 8b, by a rod 40 provided between the head 33 and mold 34 to partly intrude into the pass of the tubular parison. Thus, the pyramid frustums 37 and bottom walls 38 can be easily applied to the indented portion of the tubular parison TP. When the molds 34 and 35 are closed and air is blown into the tubular parison TP, the plastic bumper 1 of the first embodiment will be completed.

According to the bumper 1 of the first embodiment, since each pyramid frustum 4 formed in the rear wall member 3 has four side walls: two side walls generally extending vertically; and the remaining two side walls generally extending horizontally, the bumper 1 is reinforced in vertical and horizontal directions. By the above construction, the bumper 1 according to the present invention will have enough strength and rigidity against external impacts in horizontal and vertical directions even if the walls are constructed with thin plastics.

Moreover, the rear wall member 3 or the front wall member 2 has a configuration capable of being produced by a single step of molding. Thus, the bumper 1 can be manufactured easily by integral molding and with lower cost, and yet maintaining acceptable performance.

Figure 12:
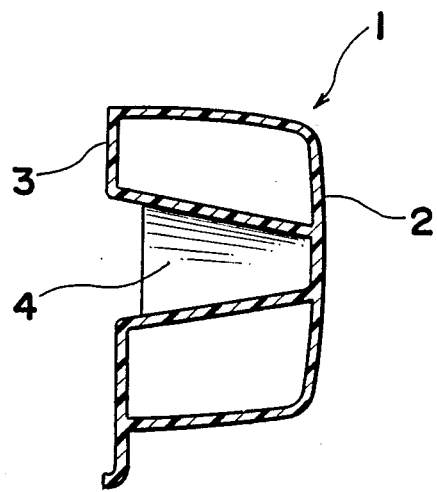
FIG. 12 is a cross-sectional view taken along a line XII—XII shown in FIG. 10.
Figure 13:
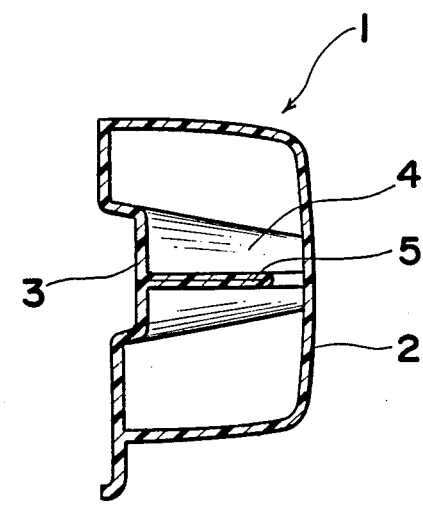
FIG. 13 is a cross-sectional view taken along a line XIII—XIII shown in FIG. 10.

Referring to FIGS. 9 to 13, a plastic bumper 1 according to a second embodiment of the present invention is shown, which comprises a front wall member 2 generally having a U-shape cross-section, as clearly shown in FIGS. 12 and 13, and a rear wall member 3 having a mid portion intermittently indented to form a plurality of recesses 4 each having a shape of pyramid frustum, in the same manner as the first embodiment. The outer end face of each pyramid frustum 4 is adhered to the inside face of front wall member 2. According to the second embodiment, the rear wall member 3 also has a plate rib 5 extending between the outer side faces of the neighboring pyramid frustums 4. Ribs 5 are also formed during the blow molding, as will be described below.

Figure 14:
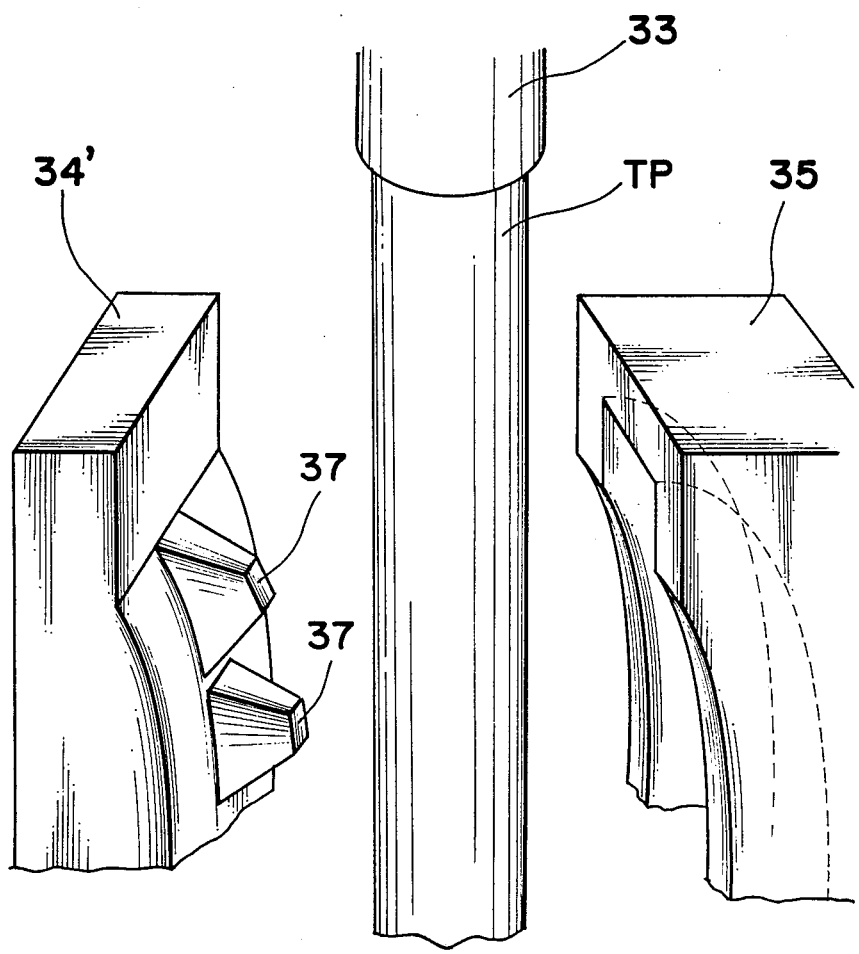
FIG. 14 is a view similar to FIG. 8a, but showing a different mold.

Referring to FIG. 14, the mold 34, for molding the plastic bumper 1 of the second embodiment has a plurality of pyramid frustums 37, but has no bottom walls 38 extending between the frustums 37. Thus, during the air blowing step, the portions of the parison extending between the pyramid frustums 37 are not completely pressed against the mold wall, but are folded into two layers to form the ribs 5. Furthermore, the parison TP applied to the molds is maintained circle tube in this embodiment According to the bumper 1 of the second embodiment, in addition to the pyramid frustums 4, plate ribs 5 are provided, which further reinforces the bumper structure with respect to impacts in the vertical direction.

Moreover, the bumper 1 of the second embodiment also has a configuration capable of being produced by a single step of blow-molding. Thus, the bumper 1 can be manufactured easily with cost effective.

Figure 15:
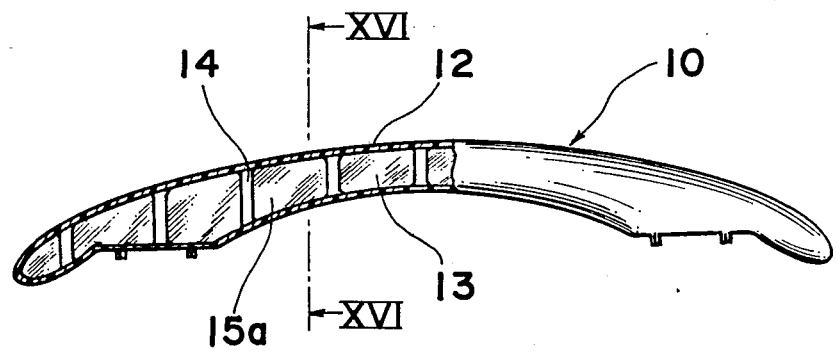
FIG. 15 is a partly cut off top plan view of a plastic bumper according to a third embodiment of the present invention.
Figure 16:
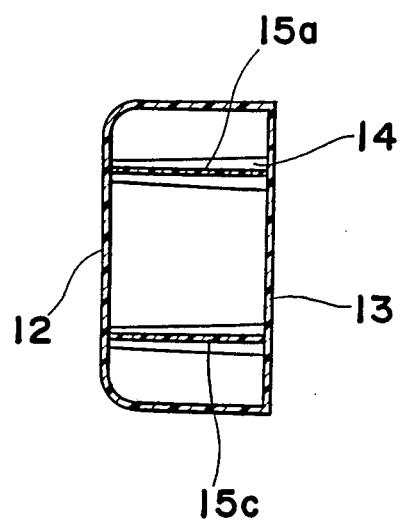
FIG. 16 is a cross-sectional view taken along a line XVI—XVI shown in FIG. 15.
Figure 17:
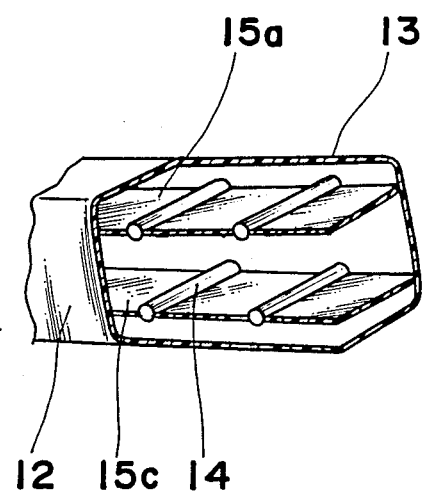
FIG. 17 is a fragmentary view showing inside structure of the bumper shown in FIG. 15.

Referring to FIGS. 15 to 17, a plastic bumper 10 according to a third embodiment of the present invention is shown, which comprises a front wall member 12 generally having a U-shape cross-section, and a rear wall member 13 having a plurality of supporting tubes 14 extending perpendicularly from the surface of the rear wall member 13. Preferably, supporting tubes 14 are aligned in two rows. The rear wall member 13 further has plate ribs 15a and 15c extending between neighboring supporting tubes 14 to rigidly support the supporting tubes. The ribs 15a and 15c extend entirely between the front and rear wall members 12 and 13, and are formed during the blow molding, as will be described below.

Figure 18:
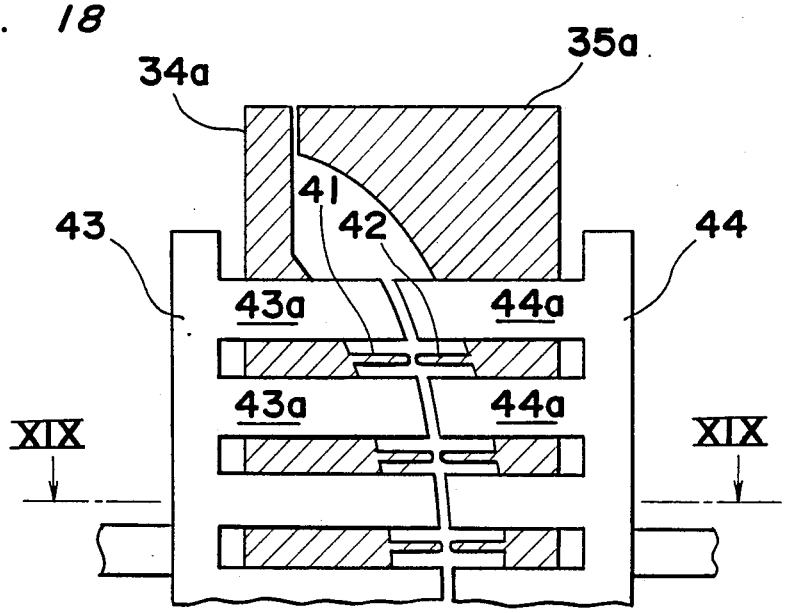
FIG. 18 is a vertical cross-sectional view of the molds used for producing the plastic bumper of FIG. 15.
Figure 19:
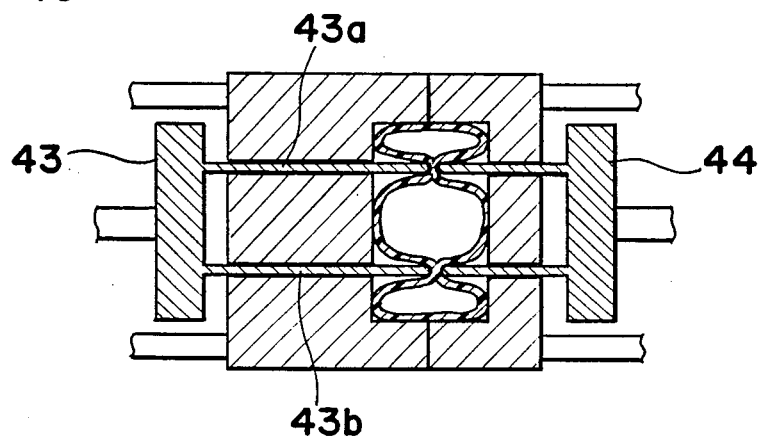
FIG. 19 is a cross-sectional view taken along line XIX—XIX shown in FIG. 18.
Figure 20:
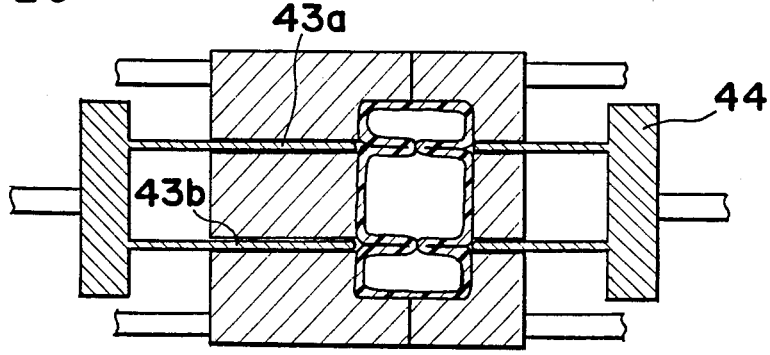
FIG. 20 is a view similar to FIG. 19, but showing a position in which the movable pin is pulled outwardly.

Referring to FIGS. 18 to 20, molds 34a and 35a are shown to explain the molding process of the plastic bumper of FIG. 15. Molds 34a and 35a has a number of pins 41 and 42 extending towards each other so that, when molds 34a and 35a are closed, the ends of pins 41 and 42 are located closely adjacent to each other. Pins 41 are aligned in two rows, and pins 42 are also aligned in two rows. Further provided are comb shaped elements 43 and 44, movably inserted into molds 34a and 35a, respectively. The comb shaped element 43 has two alignments 43a and 43b of teeth, in parallel and interleaved relationship with pins 41. Similarly comb shaped element 44 has two alignments 44a and 44b of teeth, in parallel and interleaved relationship with pins 42.

The molds 34a and 35a are closed with the comb shaped elements 44 and 45 held in the inserted position, as shown in FIG. 19. Thereafter, the comb shaped elements 44 and 45 are moved away from each other to the retracted position, as shown in FIG. 20, so that the teeth 43a and 44a are completely pulled out from the cavity. During the movement of comb shaped elements 43 and 44, the portions of the tubular parison are folded into two layers with the ends of the opposing folded portions being held contact. Also, by the heat escaping through the comb shaped elements 43 and 44, the folded portions are cooled at an appropriate speed to maintained the shape of the folded position, thereby forming the ribs 15a and 15b between the supporting tubes 14. The supporting tubes are formed by pins 41 and 42.

According to the bumper 10 of the third embodiment, since plate ribs 15a and 15c generally extend horizontally and entirely between the front wall member 12 and rear wall member 13, the bumper 10 is further reinforced. Thus, the bumper 10 will not be easily deformed by the external impacts in horizontal or vertical directions, even if the walls are formed by thinner plastics.

Moreover, the rear wall member 13 or the front wall member 12 has a shape capable of being formed by the single step of blow-molding. Thus, the bumper 10 can be manufactured easily and cost effective.

Referring to FIGS. 21, 22 and 23, a plastic bumper 10 according a fourth embodiment of the present invention is shown. The plastic bumper 10 of this embodiment is similar to the third embodiment, but further has a vertically extending rib 15b extending between supporting tubes 14. This can be formed in a similar manner to that described above in connection with FIGS. 18 to 20.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A plastic bumper for use in an automobile comprising:
    a front wall member generally having a U-shape cross-section; and
    a rear wall member having a mid portion intermittently indented to form a plurality of recesses each having a shape of pyramid frustum, an outer end face of each pyramid frustum recess being adhered to an inside face of said front wall member.

2. A plastic bumper as claimed in claim 1, wherein said front wall member and said rear wall member are formed integrally by blow molding.

3. A plastic bumper as claimed in claim 1, further comprising a plate rib extending between outer side faces of the neighboring pyramid frustums recesses.

4. A plastic bumper as claimed in claim 3, wherein said front wall member, said rear wall member and said plate ribs are formed integrally by blow molding.

5. A plastic bumper for use in an automobile comprising:
    a front wall member generally having a U-shape cross-section; and
    a rear wall member having a plurality of supporting tubes extending from a surface of said rear wall member and plate ribs extending between neighboring supporting tubes.

6. A plastic bumper as claimed in claim 5, wherein said plate ribs extend horizontally between said supporting tubes.

7. A plastic bumper as claimed in claim 6, wherein said plate ribs further extend vertically between said supporting tubes.

8. A plastic bumper as claimed in claim 5, wherein said front wall member and said rear wall member are formed integrally by blow molding.

* * * * *

REEXAMINATION CERTIFICATE (1693rd)

United States Patent [19]

Hanafusa et al.

[11] B1 4,951,986

[45] Certificate Issued May 5, 1992

[54] PLASTIC BUMPER

[75] Inventors: Kunio Hanafusa; Naoshige Fukuhara; Takaaki Tachibana, all of Okayama, Japan

[73] Assignee: Minoru Industrial Co., Ltd., Okayama, Japan

Reexamination Request:
No. 90/002,314, Apr. 5, 1991

Reexamination Certificate for:
Patent No.: 4,951,986
Issued: Aug. 28, 1990
Appl. No.: 453,942
Filed: Dec. 20, 1989

[30] Foreign Application Priority Data

Dec. 24, 1988 [JP] Japan ................ 63-327488
Dec. 24, 1988 [JP] Japan ................ 63-327489
May 15, 1989 [JP] Japan ................ 1-122290

[51] Int. Cl.$^5$ ............................ B60R 19/00
[52] U.S. Cl. ................... 293/120; 293/122; 293/133; 264/523
[58] Field of Search ............. 293/120, 122, 132, 133, 293/102

[56] References Cited

FOREIGN PATENT DOCUMENTS

| | | |
|---|---|---|
| 249518 | 12/1987 | European Pat. Off. . |
| 2509265 | 9/1975 | Fed. Rep. of Germany . |
| 3328978 | 2/1985 | Fed. Rep. of Germany . |
| 8804970 | 6/1988 | Fed. Rep. of Germany . |
| 2536711 | 6/1984 | France . |
| 2550498 | 2/1985 | France . |
| 57-69129 | 4/1982 | Japan . |
| 1501649 | 2/1978 | United Kingdom . |

*Primary Examiner*—Robert R. Song

[57] ABSTRACT

A plastic bumper for use in an automobile includes a front wall member generally having a U-shape cross-section, and a rear wall member having a mid portion intermittently indented to form a plurality of pyramid frustum shaped recesses. An outer end face of each pyramid frustum recess is adhered to an inside face of said front wall member. Thus, the bumper is reinforced with respect to vertical and horizontal impacts.

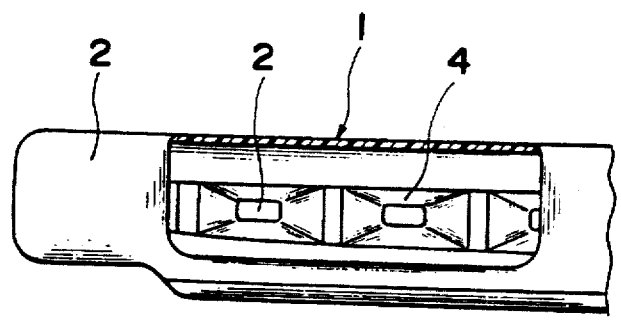

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-3, 4, and 8 are cancelled.

Claims 5-7 are determined to be patentable as amended.

New claims 9-13 are added and determined to be patentable.

5. [A] *An elongated one-piece* plastic bumper for use in an automobile comprising:
   a closed hollow tubular body;
   a front wall [member] *of said tubular body* generally having a U-shape cross-section; and
   a rear wall [member] *of said tubular body* [having a plurality of supporting tubes extending from a surface of said rear wall member and plate ribs extending between neighboring supporting tubes];
   *at least two rows of supporting tubes aligned along said elongated one-piece plastic bumper and each extending between said front and rear walls of said tubular body; and*
   *a plurality of plate ribs extending between neighboring supporting tubes and between said front and rear walls of said tubular body, at least one plate rib also extending between said front and rear walls.*

6. [A] *An elongated one-piece* plastic bumper as claimed in claim 5, wherein said plate ribs extend [horizontally] between said supporting tubes *in a pair of major planes each including one of said two rows of supporting tubes.*

7. [A] *An elongated one-piece* plastic bumper as claimed in claim 6, wherein said plate ribs further extend [vertically] between said *two rows of* supporting tubes *in minor planes which are perpendicular to said major planes.*

9. *An elongated one-piece plastic bumper for use in an automobile comprising:*
   *a closed hollow tubular body;*
   *a front wall of said tubular body generally having a U-shaped cross section;*
   *a rear wall of said tubular body having a mid portion intermittently indented to form a plurality of recesses which are aligned in a longitudinal direction of said elongated plastic bumper, each recess having a shape of pyramid frustum, and an outer end face of each pyramid frustum recess being adhered to an inside face of said front wall; and*
   *a plate rib extending between outer side faces of neighboring pyramid frustum recesses in a plane perpendicular to said outer end face of said pyramid frustum recess.*

10. *An elongated plastic bumper for use in an automobile comprising:*
    *a front wall generally having a U-shaped cross section;*
    *a rear wall having a mid portion intermittently indented to form a plurality of recesses which are aligned in a longitudinal direction of said elongated plastic bumper, each recess having a shape of pyramid frustum, and an outer end face of each pyramid frustum recess being adhered to an inside face of said front wall; and*
    *a plate rib extending between outer side faces of neighboring pyramid frustum recesses in a plane perpendicular to said outer end face of said pyramid frustum recess, wherein said plate rib has a double folded layer structure.*

11. *An elongated plastic bumper for use in an automobile comprising:*
    *a front wall generally having a U-shaped cross section;*
    *a rear wall;*
    *at least two rows of supporting tubes aligned along said elongated plastic bumper and each extending between said front and rear walls;*
    *a plurality of plate ribs extending between neighboring supporting tubes, wherein said plate ribs each have a double folded layer structure.*

12. *An elongated plastic bumper of claim 11, wherein said plate ribs extend between said supporting tubes in a pair of major planes each including one of said two rows of supporting tubes.*

13. *An elongated plastic bumper of claim 12, wherein said plate ribs further extend between said two rows of supporting tubes in minor planes which are perpendicular to said major planes.*

* * * * *